Patented Dec. 22, 1936

UNITED STATES PATENT OFFICE 2,065,117

METHOD OF MAKING A WATER-SOFTENING CLEANSER

Bert O. Crites, University Heights, Ohio, assignor to The Climalene Company, Canton, Ohio, a corporation of Ohio No Drawing. Application April 19, 1933, Serial No. 666,857

1 Claim. (Cl. 87—5)

In soap powders for domestic use, certain difficulties and drawbacks have heretofore been characteristic; particularly the tendency to raise an impalpable dust which when inhaled is irritant and disagreeable; and again, the tendency to lather poorly where very hard water is encountered. Efforts to compensate the latter limitation by addition of free alkali agents has not only accentuated the dusting tendency, but also introduced a further difficulty through the proneness of the respective constituents to segregate out into separate zones. A product which is available for highly varied water conditions, irrespective of hardness, and which at the same time is free from disagreeable tendency to raise fine irritating dust in use, is accordingly of particular importance in the art and highly desirable.

To the accomplishment of the foregoing and related ends, the invention, then, comprises the features hereinafter fully described, and particularly pointed out in the claim, the following description setting forth in detail certain illustrative embodiments of the invention, these being indicative however, of but a few of the various ways in which the principle of the invention may be employed.

In accordance with the invention, I prepare a cleanser of highly advantageous physical properties, by incorporating an alkali metal carbonate and phosphate with a fatty acid, reaction proceeding rapidly to the formation of a solid product which on suitable subdivision to desired particle size, is of dry-pouring character. The invention will be readily understood from an illustrative example:

A suitable fatty acid, preferably tallow acids as of titre 41 and acid content 98 per cent plus, in convenient amount, is heated in a jacketed kettle to about 120° F., being stirred by suitable agitating means. An alkali metal carbonate, preferably sodium sesqui-carbonate,

$$Na_4H_2(CO_3)_3 3H_2O,$$

is stirred in, in amount for instance of 80 parts, the stirring being continued for a minute or so after the addition. Then an alkali metal phosphate, preferably tri-sodium phosphate, is stirred in, in amount for instance of 40 parts, the stirring being continued for a minute or so after the completion of the addition. Another quantity of the sesqui-carbonate, for instance 80 parts, is stirred in, and then another quantity of the phosphate, for instance 40 parts, and finally about 160 parts of the sesqui-carbonate, and during the last stirring a perfuming agent may be added, as for instance 2½ parts of citronella oil. After the first addition of sesqui-carbonate, the material quickly changes from a clear transparency to a turbid opaque lighter color, although still very fluid. With successive additions, the product thickens, finally becoming pasty and then breaking apart into chunks which, as the stirring continues, ball up into pebble-character of varying sizes. The operation consumes about 15 or 20 minutes, and the product is finally disintegrated to desired size by any suitable means. If sized to particles of 20-80 mesh, the product is of a character to be most generally applicably useful.

The proportions of carbonate and phosphate and acid may in general range about 35-45 per cent for sodium sesqui-carbonate, about 2-10 per cent of tri-sodium phosphate, and about 45-65 per cent of fatty acids, amounts being by weight as customary. The phosphate is desirably in a minor proportion as compared with the carbonate, and may range in general about 5-30 per cent that of the carbonate. The product, particularly where made with sodium sesqui-carbonate, is notably free from disagreeable dusting tendency, and the particles on microscopic examination show a composition of soap binder with free carbonate and phosphate held effectively in engagement, and consequently being non-segregatable under handling and packing, etc., and remaining uniform and homogenous. The apparent specific gravity is about 0.551.

Such a product is of special advantage where it is to be used from a sifting form of container, as is desirable for household purposes and in such usage, maintains its uniform composition from top to bottom of the package, and irrespective of the sifting operation is not prone to disagreeable disengagement of light floating dust which is irritant when inhaled.

Other modes of applying the principle of the invention may be employed, change being made as regards the details described, provided the features stated in the following claim, or the equivalent of such, be employed.

I therefore particularly point out and distinctly claim as my invention:—

A process of making a water softening cleanser which comprises melting about 45 to about 65 parts by weight of normally solid commercial soap-making fatty acids of not less than 98 per cent free acid content to a temperature of about 120° F., stirring said acid, adding about 35 to about 45 parts by weight of sodium sesqui-carbonate, and about 2 to about 10 parts of tri-sodium phosphate to said acid, and continuing said stirring action until balls of pebble-like character are formed, then disintegrating such balls to produce firm substantially dustless coherent particles of uniform composition.

BERT O. CRITES.